Dec. 23, 1941.  M. STOCKTON  2,267,052
UNITARY INSURANCE MANUAL AND APPLICATION BOOK
Filed March 4, 1939  2 Sheets-Sheet 1

INVENTOR
Manley Stockton
BY
ATTORNEY

Dec. 23, 1941.  M. STOCKTON  2,267,052

UNITARY INSURANCE MANUAL AND APPLICATION BOOK

Filed March 4, 1939  2 Sheets-Sheet 2

INVENTOR
Manley Stockton
BY M. J. Reynolds
ATTORNEY

Patented Dec. 23, 1941

2,267,052

UNITED STATES PATENT OFFICE 2,267,052

UNITARY INSURANCE MANUAL AND APPLICATION BOOK

Manley Stockton, Atlanta, Ga., assignor to Hartford Fire Insurance Company, Hartford, Conn., a corporation of Connecticut Application March 4, 1939, Serial No. 259,761

1 Claim. (Cl. 283—63)

This invention relates to a combined manual and application book for the use of insurance agents or insurance brokers in the solicitation of insurance and the reporting thereon to the company. It is described herein with particular reference to insurance against the perils insured against by fire, marine and casualty insurance companies, but it will be understood that the invention is equally applicable to other forms of insurance.

At the present time, it is customary, in the writing of insurance, for the agent or broker to be supplied with a large number of application blanks or forms, there being ordinarily a special application blank for each of many different subject matters of insurance. A partial list of such blanks includes aircraft damage, annual shippers, annual transit, automobile, bridges, camera, contractors' equipment, customers' goods, etc. The agent must not only keep in his files a sufficient supply of each of such application blanks but must actually carry a number of them with him, when soliciting business out of his office, and to replenish his stock as the blanks are used. As a result of the burden of carrying a large number of different varieties of forms, it is usual for the agent to carry only those which he contemplates he may need. Consequently he sometimes finds himself embarrassed by not having available the proper blank.

One of the objects of the present invention is to avoid this difficulty by providing a simple arrangement of blanks and instructions for their use whereby the agent may be assured of having available, at all times, a copious supply of blanks suitable for substantially all types and varieties of risks.

Another object is to provide an arrangement which will facilitate the collection and recording of information required for the preparation of policies for a large variety of risks.

Another object is to combine in a single unit both the information necessary to explain and sell the policy, the information necessary to prepare the application, and the blanks or forms upon which to record the latter information and to order the policy from the insurance company.

Another object is to provide an application for insurance so designed that the information contained therein is usable only in connection with a questionnaire forming a code by which such information is rendered intelligible.

Other objects and advantages will hereinafter appear.

In accordance with my invention I preferably employ a book of the loose leaf type in which is included a supply of blanks or forms, a manual of information and instructions to the agent or broker for the solicitation of the insurance and a questionnaire for use in the preparation of the application, with regard to a large number of different subject matters of insurance. The forms or blanks are common to all of such subject matters and are so arranged relative to the manual and question sheets that the questions to be answered or instructions to be followed, appearing on one sheet, and the spaces in which the answers to such questions or instructions are to be recorded, provided on another sheet, are both exposed in a single open position of the book.

The invention will be more fully understood by reference to the accompanying drawings in which:

Fig. 2 is a plan view of the front side of a manual and question sheet showing the arrangement of the questions thereon;

Fig. 3 is a plan view of the reverse side of the manual and question sheet, showing the arrangement of the manual data; and Fig. 4 is a plan view of the application blank for use with any of the question sheets.

Figure 1:
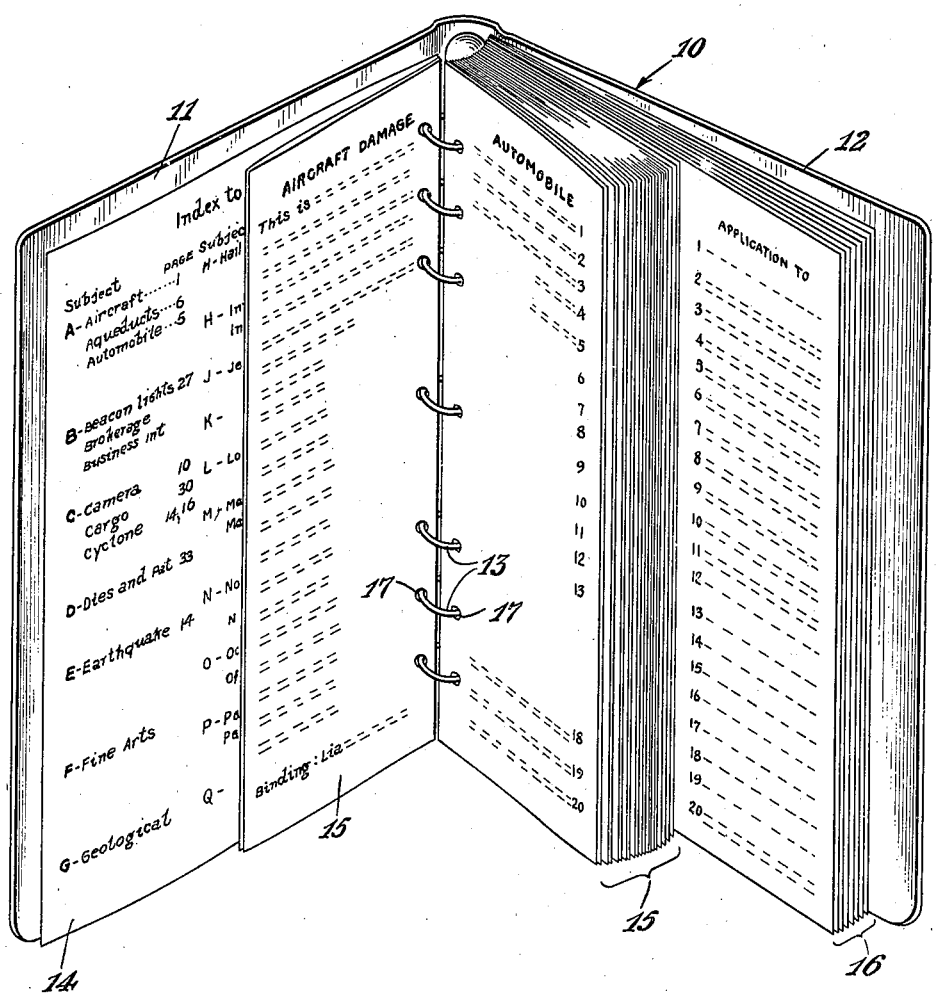
Fig. 1 is a perspective view of the book and contents showing the relative arrangement of the instruction sheets and application forms.

Referring in detail to the drawings, I have shown a note book 10 provided with relatively hard and stiff covers 11, 12, and suitable loose leaf securing means, such as snap rings 13. The loose leaves of the book comprise an index sheet or sheets 14, a group of manual and question sheets 15 and a group of application blanks or forms 16. The manual and question sheets 15 are individual to each type of risk, each sheet containing only questions, instructions or information relating to or required in the preparing of the application for risk referred to in the heading of the sheet. Thus any manual and question sheet may be removed or replaced or additional sheets inserted without interfering with the arrangement or use of the remaining sheets. The sheets 15 are perforated along one side, at 17, for reception of the rings 13.

The application sheets 16 are common to all instruction sheets, each being perforated at 19 along one edge only so that when the application sheets are assembled in the book to the rear of the manual and question sheets, a substantial portion of the application sheets extend outwardly beyond the instruction sheets. The perforations 19 in the sheets 16 may be slotted as at 20, to facilitate removal of the sheets without resource to the rings 13, if desired. The outwardly extending portions of sheets 16 are provided with a number of double rulings bearing consecutive numbers, upon which may be recorded information relative to the particular policy for which application is being made. The unexposed portions of sheets 16 make available space upon which any desired remarks ancillary to said questions or instructions or with reference to the risk, may be recorded.

The manual and question sheets, as stated, are individual to each type of risk and each bears a group of questions, the answers to which are essential to the preparation of the policy. Each of these questions is also provided with a number so disposed that the number of each question will appear in the same vertical position on the sheet as the corresponding numbers of the application blanks.

The opposite side of each of the manual and question sheets 15 bears information concerning the nature and extent of the policy, the rates, premiums, etc., and, therefore, serves as a manual for the agent, and thus eliminates the necessity for the agent using a separate manual.

In use, the agent merely opens the book to the manual and question sheet covering the particular type of policy in which the subscriber is interested. By reference to the rear of the sheet 15 he can ascertain and give the subscriber the required information concerning the policy, such as coverage, rates, premiums, etc. When the application for insurance is to be prepared, the agent swings the sheet 15 back to the right hand side of the book so as to have before him, in view, both the questions to be answered and the space on the application sheets 16 on which to enter the answers to such questions. He then merely enters the answers to such questions on the rulings of sheet 16 bearing the numbers corresponding to the numbers of the questions. Since corresponding numbers appear opposite each other on the question sheet and application forms, the answers on the application forms will appear opposite their corresponding questions. After sheet 16 has been filled out, it may be submitted to the office of the insurance company for approval and for preparation of the policy. At that office, the desired information for preparing the policy is obtained only by reference to a question sheet corresponding to the one used by the agent. This renders it impossible for the information contained in the application to be intelligible to others than the authorized recipient of the application, who is provided with a coded question sheet, and precludes the agent or broker from ordering the policy, by means of such application sheets, from another insurance company than the one supplying the coded questionnaires.

It will be noted that each question is not limited to a single code number or designation. Where additional space is required for an answer, several consecutive numbers may be allotted to a single question, as in the case of the "schedule of insurance" shown in the illustration. Also, as shown in the "example" in Fig. 2, under numbers 11 to 14, several answers may be required on a single line or pair of lines.

If changes are made from time to time by the insurance company in reference to any type of policy, it is necessary only to have the agent substitute in his book a new manual and question sheet for the superceded one but necessitates no change in the application blank. This eliminates the necessity of destroying large supplies of printed forms, as heretofore required, and also reduces the possibility of an agent or broker using a superceded form, as now often occurs.

The book, because of its stiff cover, may be conveniently used directly upon the agent's lap and because of the complete nature thereof with reference to substantially all forms of risk written by the company issuing the same, it may serve as substantially his complete office file in regard to many of the writings of that company.

Obviously, changes may be made in the arrangement of the parts and the manner of correlating the questions and answers, without departing from the invention.

What I claim is:

In a combined insurance manual and confidential application form book for the display of applications for insurance, the combination of a plurality of application sheets disposed one above the other in contiguous relation, a plurality of instruction sheets of smaller transverse dimensions than said application sheets and overlying the same so as to leave a substantial portion of said application sheets exposed, each of said information sheets bearing a different series of items in the form of questions or instructions, code designations on each of said instruction sheets associated with each item thereon, said application sheets having on the exposed portion thereof a series of corresponding code designations and transverse rulings for the reception of information relative to the correspondingly designated items, whereby any of said instruction sheets may be individually associated in exposed position with the exposed portion of said application sheets and a loose-leaf binder securing said sheets and by means of which the application sheets may be individually removed from said book.

MANLEY STOCKTON.